July 13, 1965 C. A. LEE 3,194,978

STRIP LINE TUNNEL DIODE DEVICE UTILIZED AS SINGLE POLE, MULTIPLE THROW SWITCH

Filed Aug. 29, 1961

INVENTOR
C. A. LEE
BY David P. Kelley
ATTORNEY

United States Patent Office 3,194,978
Patented July 13, 1965

3,194,978

STRIP LINE TUNNEL DIODE DEVICE UTILIZED AS SINGLE POLE, MULTIPLE THROW SWITCH

Charles A. Lee, New Providence, N.J., assignor to Bell Telephone Laboratories, Incorporated, New York, N.Y., a corporation of New York Filed Aug. 29, 1961, Ser. No. 134,679
5 Claims. (Cl. 307—88.5)

This invention relates to semiconductive devices, and, more particularly, to devices which utilize "Esaki," or tunnel, diodes.

It is well known to workers in the art that a tunnel diode, which has a single narrow p-n rectifying junction between two degenerate regions, exhibits a negative resistance region in the forward current-voltage characteristic upon application of a proper bias. This negative resistance phenomenon is the result of a quantum mechanical tunneling across the junction.

One of the principal advantages of the tunnel diode is the extreme rapidity with which it switches from a positive resistance state to a negative resistance state. This rapid change in its conducting state makes the tunnel diode particularly attractive as a high speed switching device.

High speed switches are useful in a large number and variety of systems, such as, for example, computers, memory and storage systems, and encoders. In general, in all such systems, a large number of switches are required to achieve the desired results, and, of course, the greater the number of switches, the more complex and bulky the system.

An object of the present invention is to eliminate the necessity of a large number of switches for performing a plurality of switching operations.

Another object of the present invention is to produce a plurality of selective switching operations at high speeds with a single tunnel diode device.

The present invention is based upon the fact that in an elongated or "strip line" tunnel diode of the type shown, for example, in "Principles for Esaki Diode Applications" by M. E. Hines, Bell System Technical Journal, volume 39, No. 3, May 1960, pages 477–513, there is a finite resistance to current flow parallel to the junction. When a biasing voltage is applied at one end of the strip line diode, for example, there is current flow parallel to the junction and a consequent voltage drop, with the result that the voltage across the junction varies along the length of the strip line.

It is one feature of the present invention that a variable source of biasing voltage is connected to a strip line tunnel diode. With such an arrangement, as will be explained more fully hereinafter, the bias across the junction at which the negative resistance occurs can be made to occur at any point along the strip line by varying the bias source.

It is another feature of the present invention that one or more pick-up members, such as coils, are positioned along the length of the strip line. The particular pick-up device adjacent that portion of the strip line where the negative resistance occurs will produce, as will be seen hereinafter, a signal that is out of phase with the signals produced in the remaining pick-ups. The important consideration would appear to be that when a time-varying biasing voltage is applied the sign of $dI/dt$ at a fixed position $x$ is opposite in the negative resistance region and so the induced voltage in the pick-up coil is of opposite polarity. Inasmuch as this out of phase signal may be produced at any one of the pick-ups, depending upon the value of the bias voltage, it can be seen that the device of the invention functions as a single pole, multiple throw switch.

The invention will be more fully understood from the following detailed description, taken in conjunction with the accompanying drawings, in which.

Figure 1:
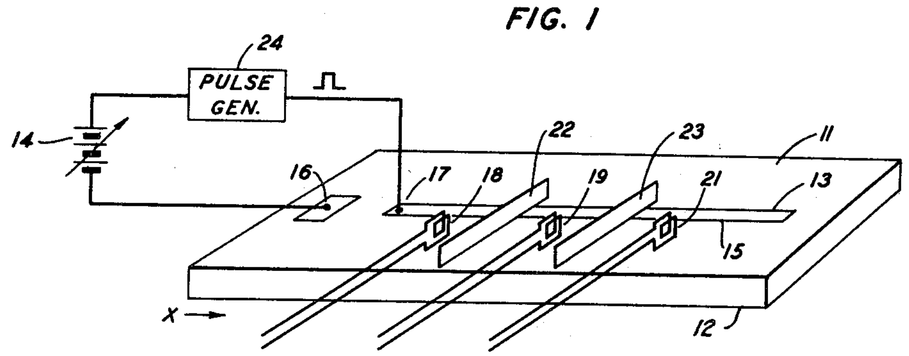
FIG. 1 is a partially schematic, partially perspective view of one embodiment of the invention.

Turning now to FIG. 1, there is depicted a strip line tunnel diode 11 which comprises a monocrystalline semiconductive body which includes a base region 12 of N-type material and a strip 13 of P-type material, defining therebetween an elongated strip p-n junction 15. The semiconductive body may be fabricated in a variety of known ways. For example, a heavily doped N-type germanium body can have deposited on one of its surfaces a strip of aluminum and this aluminum strip is thereafter alloyed in to form a heavily doped P-type region, the original body and the alloy region thereafter corresponding to base region 12 and strip region 13. The alloy cycle is adjusted to result in a p-n junction whose depletion region is narrow, typically about 100 Angstroms wide, in the manner characteristic of tunnel diodes.

A variable source 14 of bias voltage is connected to the base 12 and strip 13 at one end of the body through ohmic contacts 16 and 17, respectively. Disposed along the strip line adjacent the junction 15 between members 12 and 13 are a plurality of flat wound pick-up coils 18, 19, 21, the plane of each coil being perpendicular to the strip line 11. To prevent cross coupling between adjacent coils, a plurality of shields 22, 23 are provided. It is to be understood that while only three coils have been shown, various numbers of coils may be used, depending upon the particular application.

For illustrating the operation of the device of FIG. 1, a square pulse generator 24 is shown connected in series with source 14. With this arrangement, as described previously, the pulse generated in the pick-up coil opposite the negative resistance region will be opposite in polarity to the pulses generated in all of the other pick-up coils. As will be apparent hereinafter, generator 24 is symbolic of a large number of possible devices which might be used.

Figure 2:
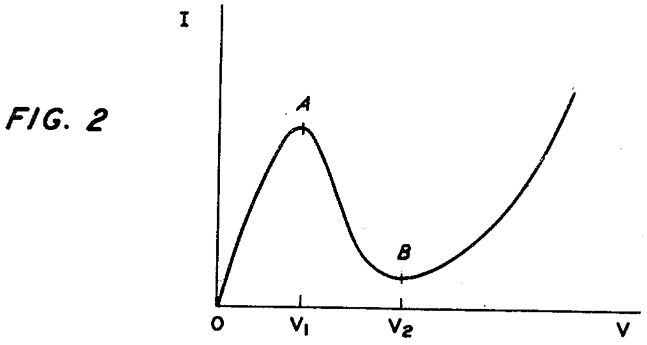
FIG. 2 is a diagram of the current-voltage characteristic of a typical tunnel diode.

In FIG. 2, there is shown the current-voltage characteristic of a typical tunnel diode, in which the abscissa represents the voltage V across the p-n junction and the ordinate represents current I through the junction. From FIG. 2, it can be seen that when V is zero, I is zero, and as V increases from 0 to point A, I increases also. At point A, when V has a value $V_1$, the tunneling process begins to produce a negative resistance. From point A to point B, it can be seen that I decreases as V increases from the value $V_1$ to $V_2$. For values of V greater than $V_2$, the tunneling effect no longer produces an over-all negative resistance and I increases with increasing V. From the foregoing, it can be seen that when the bias voltage across the junction is between the valves $V_1$ and $V_2$, the diode exhibits a negative resistance, but for all other values of V in the forward direction, the resistance is positive.

Returning to FIG. 1, the operation of the device is as follows. Inasmuch as both members 12 and 13 have a finite resistance to current flow in the $x$ direction, that is, parallel to the junction 15 between 12 and 13, upon application of a bias voltage at 16 and 17, there will be a voltage drop along the length of the strip line 11 as a result of the current flow in the $x$ direction. As a result, the voltage across the junction at its left-hand end as depicted in FIG. 1 will be greater than the voltage across the junction at the right-hand end. It can be appreciated, therefore, that the voltage $V_1$ as shown in FIG. 2, will, with proper choice of parameters, occur at some intermediate point between the ends of line 11. It can further be appreciated that varying the voltage of source 14 will cause this intermediate point to shift along the line. For example, if the voltage applied between 16 and 17 is greater than $V_2$, and the voltage drop is such that the voltage across the junction adjacent coil 21 is less than $V_1$, then a voltage across the junction of a value between $V_1$ and $V_2$ occurs, for example, adjacent coil 19. If the voltage between 16 and 17 is decreased sufficiently, the voltage of value between $V_1$ and $V_2$ occurs adjacent coil 18. In the same manner, a sufficient increase in bias voltage causes the tunneling voltage to occur adjacent coil 21.

For purposes of illustration, assume that the voltage between 16 and 17 is of such a value that a voltage intermediate $V_1$ and $V_2$ occurs adjacent coil 19. When a square wave pulse from generator 24 is applied, coil 18 produces a positive pulse, inasmuch as the junction adjacent coil 18 is in the positive resistance region beyond point B of FIG. 2. Coil 21 also produces a positive pulse inasmuch as the junction adjacent coil 21 is in the positive resistance region between 0 and point A of FIG. 2. On the other hand, the junction adjacent coil 19 is in the negative resistance region between points A and B of FIG. 2, and, as a consequence, the positive-going pulse causes a decrease in current across the junction, and coil 19 thereby produces a pulse of opopsite polarity to those produced in the other coils. If the various coils are each connected to circuitry which responds only to negative pulses, then only the circuit connected to coil 19 is activated, or switched on. On the other hand, the negative pulse from coil 19 may be used to switch its circuit off while the remaining circuits stay turned on. It is clear that the phase reversal produced in one of the pick-up coils can be used in a variety of ways, the examples here given being merely for purposes of illustration.

In the foregoing, the negative resistance region was assumed to be located opposite a particular pick-up coil through adjustment of the bias voltage only. Where the pulse voltage is sufficiently high, the sum of the pulse voltage and the bias voltage may be used to place the tunneling region opposite a particular coil. Thus, the bias voltage alone can be used to place the tunneling region opposite coil 18, but occurrence of a pulse causes a rapid shifting of this region to a point adjacent coil 19. For certain applications, it might be possible to eliminate the D.-C. bias source completely, utilizing only the pulse source to produce the desired bias. It can also be seen that a single pick-up coil can be used instead of a plurality of coils. Such an arrangement might be used to measure input pulse magnitudes, or to respond to a pulse of a particular magnitude to produce a switching action.

Figure 3:
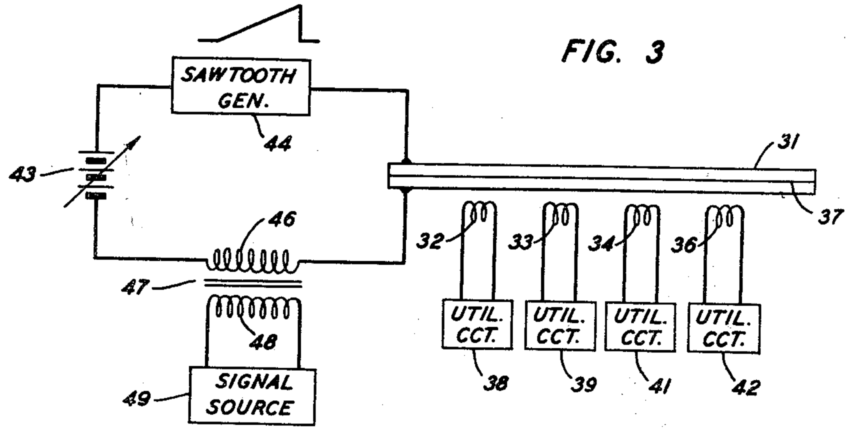
FIG. 3 is a schematic of an exemplary circuit utilizing the present invention.

In FIG. 3 there is shown schematically a circuit arrangement whereby the present invention functions as a signal sampling device. The circuit of FIG. 3 comprises a strip line tunnel diode 31, of the type shown in FIG. 1, having a plurality of pick-up coils 32, 33, 34, 36, in inductive coupling relationship to the junction 37. The coils are shown connected to utilization circuits 38, 39, 41, 42, which may be any of a large number of different type circuits, or even a single circuit, depending upon the particular application. A source 43 of variable D.-C. voltage is connected to the diode 31 for producing a potential difference across the junction 37. In series between the source 43 and the diode 31 are a sawtooth wave generator 44 and the secondary winding 46 of a signal input transformer 47, the primary winding 48 of which is connected to a source of signals 49.

In operation, the sawtooth wave superimposed on the voltage from source 43 causes the negative resistance region to sweep down the length of the diode 31. Input signals applied through transformer 47 induce voltages in the coils 32, 33, 34, 36, with the voltage thus induced in each coil undergoing a phase reversal when the negative resistance region is opposite that coil. Suitable phase sensing means, not shown, may be used to differentiate in any of a number of ways known in the art this particular induced voltage from those in the other coils to produce a signal sample.

It can be appreciated that the sawtooth voltage generator 44 alone may be used to provide the necessary potential difference across the junction. It can also be seen that if a longer signal sample is desired, a stepped voltage wave instead of a sawtooth might be used.

It should be apparent that a system such as is shown in FIG. 3 can be readily adapted to sample a plurality of information bearing channels. If each of the coils is connected in circuit with an information bearing channel in such a manner as to produce an output signal from the channel upon occurrence of a phase reversal in the coil, the various channels will each be sampled in turn when a sawtooth or step voltage is applied to the diode.

In all of the foregoing, the devices of the present invention depend upon a change in voltage to produce a change in current, which current change is detected and utilized. It is possible to produce high speed switching operations utilizing devices and circuits which depend upon a change in current to produce a change in voltage. Such devices and circuits are the subject of my copending application Serial No. 134,678, now Patent No. 3,109,109, filed August 29, 1961.

It is to be understood that the foregoing is intended to be illustrative of the principles of the invention. Various modifications and variations may occur to workers in the art without departure from the spirit and scope of the invention.

What is claimed is:

1. In combination, a circuit element comprising a tunnel diode having an elongated p-n junction, a control circuit connected to said diode, said control circuit including means for varying the voltage difference across said junction along the length thereof, and a plurality of means adjacent said junction and distributed along its length responsive to current flow through said junction for producing a signal indicative of the conduction state of said junction at different regions along its length.

2. In combination, a circuit element comprising a strip line tunnel diode having an elongated p-n junction, said diode having a finite resistance to current flow parallel to said junction, a control circuit connected to said diode, said control circuit including means for varying the conduction state of said junction along the length thereof, and a plurality of means spaced along the length of said junction for producing signals indicative of the conduction state of said junction at spaced points therelong.

3. The combination as claimed in claim 2 wherein said spaced means comprise a plurality of coils inductively coupled to said junction.

4. The combination as claimed in claim 2 wherein said control circuit comprises a source of D.-C. potential and a pulse generator.

5. The combination as claimed in claim 2 wherein said control circuit comprises a sawtooth wave generator and signal input means.

References Cited by the Examiner

UNITED STATES PATENTS

| | | | |
|---|---|---|---|
| 2,909,679 | 10/59 | Abraham | 307—88.5 |
| 3,021,459 | 2/62 | Grubbs et al. | 307—88.5 |

ARTHUR GAUSS, *Primary Examiner.*

JOHN W. HUCKERT, *Examiner.*